Oct. 10, 1933.  H. L. BLUM  1,929,406
METER
Filed Aug. 10, 1928  3 Sheets-Sheet 1

Inventor:
Hasmer L. Blum

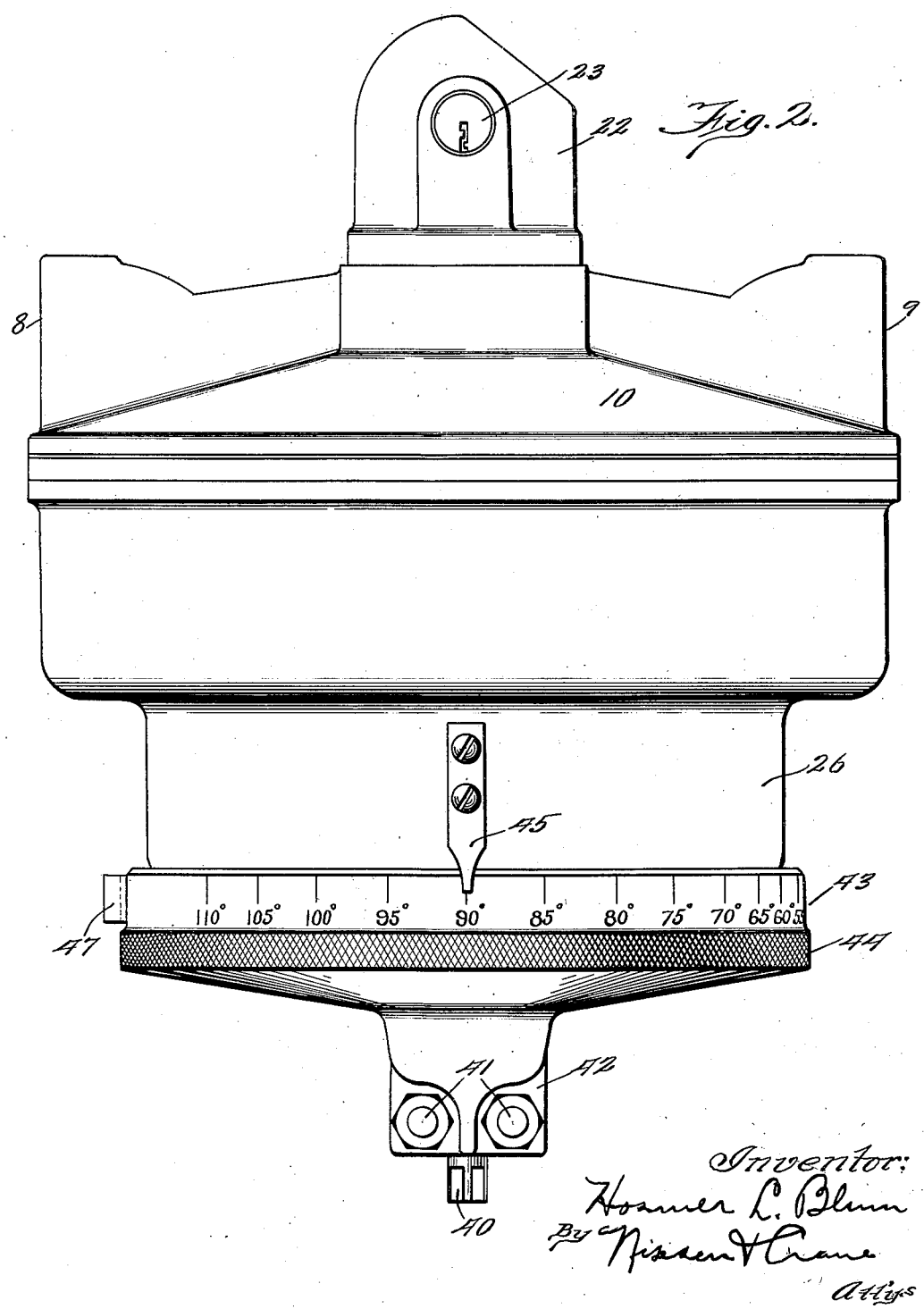

Oct. 10, 1933.    H. L. BLUM    1,929,406
METER
Filed Aug. 10, 1928    3 Sheets-Sheet 3
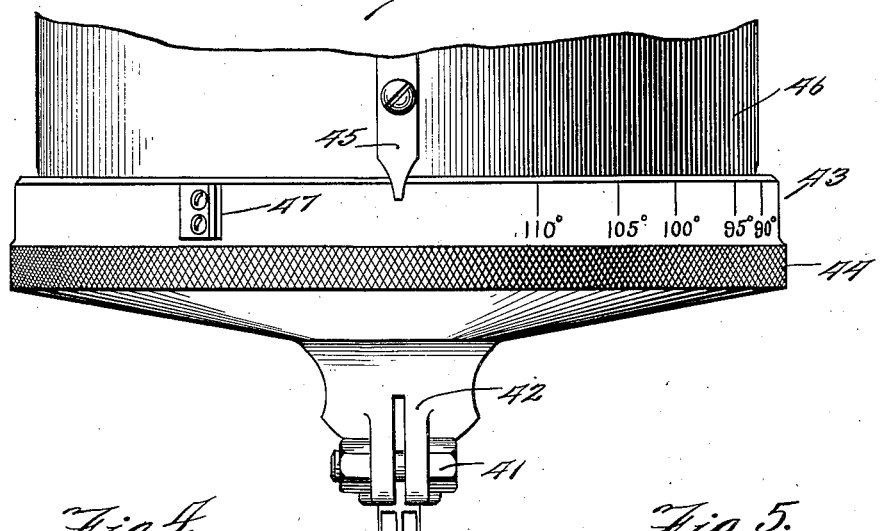
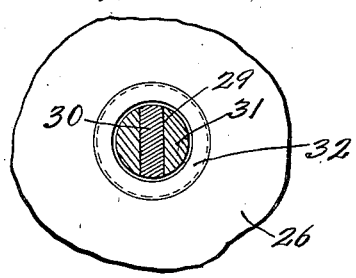
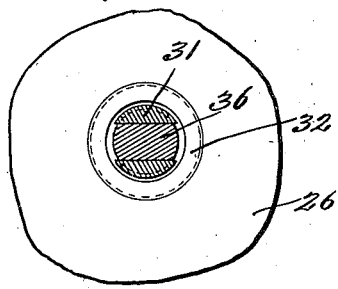
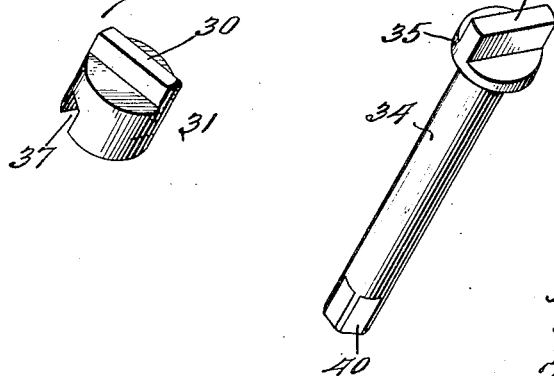
Inventor:
Hosmer L. Blum
By Nissen & Crane
Attys Patented Oct. 10, 1933

1,929,406

UNITED STATES PATENT OFFICE 1,929,406

METER

Hosmer L. Blum, Fort Wayne, Ind., assignor to S. F. Bowser & Company, Inc., Fort Wayne, Ind., a corporation of Indiana Application August 10, 1928. Serial No. 298,751

24 Claims. (Cl. 73—30)

My invention relates to meters and one of the objects thereof is the provision of improved and efficient temperature adjustment mechanism particularly adapted for use in connection with the meter shown in my Patent No. 1,423,597, granted July 25, 1922, for an improvement in meters, although it may have a general application.

Another object of the invention is the provision of indicating mechanism by means of which the meter may be adjusted in accordance with the temperature indications.

More particularly it is the object of the present invention to provide means for adjusting the meter and combine with such adjusting means an indicator with temperature indications thereon so that the meter may be adjusted by means of such indicator in accordance with the temperature of the liquid by which the meter is operated.

Other objects of the invention will appear hereinafter, the novel features and combinations being set forth in the appended claims.

In the accompanying drawings—

Fig. 2 is an elevational view of the complete meter with an adjustment wheel connected thereto with a temperature scale on such adjustment wheel;

Fig. 3 is an elevational view of the lower portion of the structure shown in Fig. 2 with the adjusting wheel and temperature scale turned 90° from the position shown in Fig. 2;

Fig. 4 is a sectional plan view taken on the line 4—4 of Fig. 1;

Fig. 5 is a sectional plan view taken on the line 5—5 of Fig. 1; and

Figs. 6 and 7 are perspective views of details of the adjusting mechanism.

Figure 1:
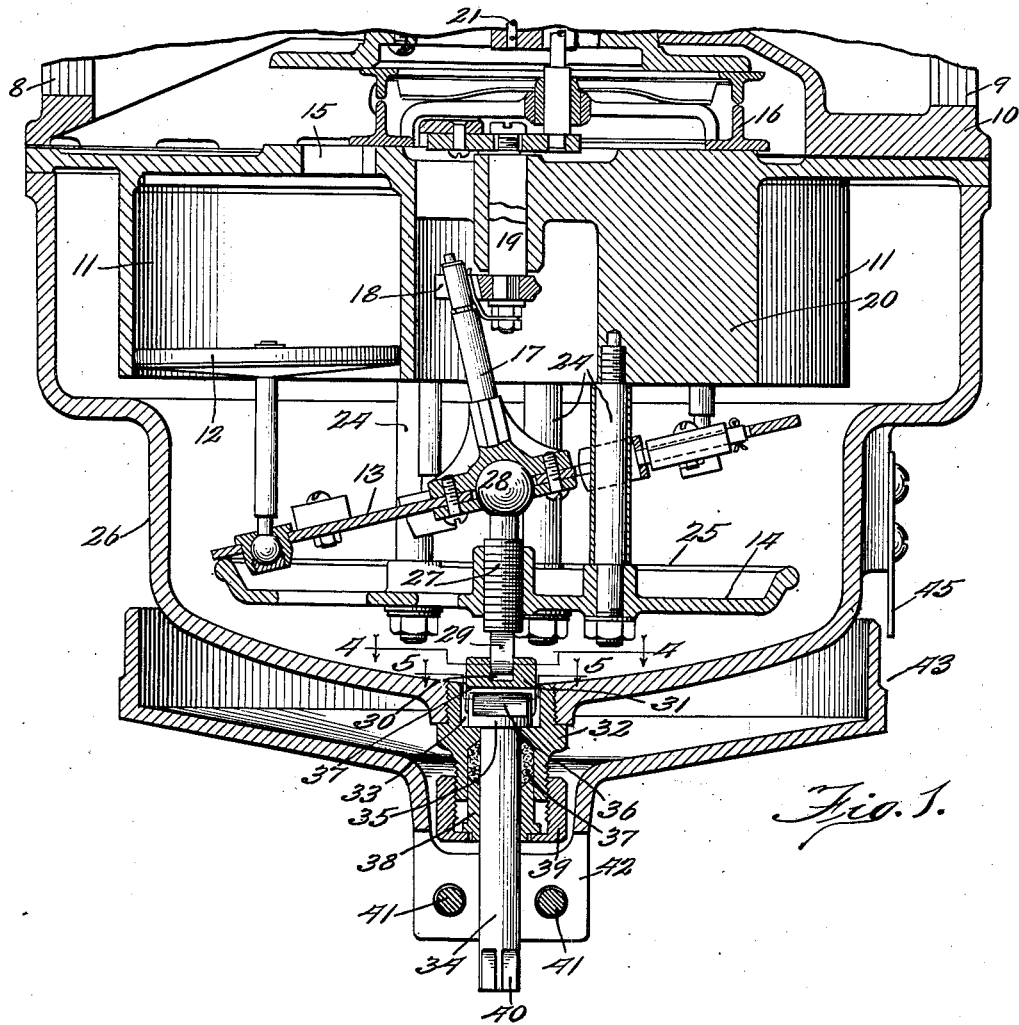
Fig. 1 is a sectional elevation of a meter embodying my invention.

It is a well-known fact that fluids do not remain constant in volume when subjected to temperature changes. When metering fluids it is usually necessary to make certain mathematical corrections for such changes in temperature. For instance, a barrel of oil weighing approximately 422 pounds may have a volume equal to 55 gallons at 60° Fahrenheit, whereas the same barrel containing the same weight of oil may have a volume equal to 56 gallons at 110°. If a meter is used for measuring the quantity of oil at 110° it would ordinarily be necessary to use a correction factor to determine the correct meter reading at 60°. By means of my invention shown in the accompanying drawings the necessity of such mathematical calculations or corrections is obviated.

It should be understood that while I have shown my invention applied to the type of meter shown in my Patent No. 1,423,597, it may be applied to any meter of the displacement type.

In Figs. 1 and 2 of the accompanying drawings, the inlet port is shown at 8 and outlet port at 9. The liquid enters into the various cylinders 11 to displace the pistons 12 and thus wabble or roll the plate 13 around on the supporting plate 14. There is a port 15 for each cylinder 11 and by means of the valve 16 the ports 15 are covered and uncovered in such a way as to cause the liquid to come into the cylinders from the port 8 and flow out from the cylinders toward the port 9.

Connected to the center of the wabble plate 13 is an inclined operating arm 17 adapted to fit into a bifurcated crank arm 18 which is connected to the vertical shaft 19 journaled in the cylinder block 20. When the shaft 19 is rotated the valve 16 is revolved and at the same time the shaft 21 is rotated to operate the totalizer which is shown at 22 in elevation in Fig. 2. This totalizer may be provided with a lock as shown at 23.

The supporting plate 14 may be supported from the cylinder block 20 by means of the depending posts 24. The plate 14 is held rigidly connected to the block 20 at a fixed predetermined distance therefrom and therefore the circular guide rail 25 is at a fixed elevation in the bowl 26 of the meter.

At the center of the supporting plate 14 is a screw-threaded opening to receive the screw-threaded stem 27 which has a ball support 28 at its upper end fitting in a socket at the center of the wabble plate 13, as shown in Fig. 1. At the lower end of the stem 27 is a depending extension 29 which is rectangular in cross-section and is adapted to fit into the slot 30 in the cylindrical block 31 shown in Figs. 1 and 6.

Screw-threaded into an opening in the bottom of the bowl 26 is a stuffing box 32 which has a cylindrical recess 33 in its upper end in communication with the interior of the bowl 26.

Through a hole in the bottom of the recess 33 extends a stem 34 which is provided with an enlarged cylindrical head 35 at its upper end with a cross-piece 36 at its upper side to serve as a key fitting in the slot 37 in the lower side of the cylindrical block 31. The stem 34 fits in the opening in the bottom of the recess 33 and the cylindrical head 35 rests against the bottom of the recess 33, as shown in Fig. 1. Packing 37' surrounds the stem 34 and is provided with a packing gland 38 adjustably held in position by the screw-threaded cap 39. It will thus be seen that the cylindrical block 31 constitutes a flexible coupling between the key 36 and the rectangular extension 29 at the bottom of the screw-threaded stem 27. The rectangular extension 29 may have a relative sliding movement up and down in the slot 30 in the flexible coupling 31. This flexible coupling rests by gravity on the upper surfaces of the cylindrical head 35 or on the upper surface of the key 36. By reason of the slots 30 and 37 being at right angles to each other this flexible coupling 31 may slide in any lateral direction to compensate for any eccentricity in the alining of the rotary actuator 34 and the screw-threaded stem 27.

The lower end of the stem 34 may be provided with flat surfaces as shown at 40 to receive a socket wrench or other tool for rotating the key 36 and thus turn through the flexible coupling 31 the screw-threaded stem 27 to lift or lower the ball 28 and the socket in which it fits. This adjustment will change the elevation of the center of the wabble plate and the displacement of the pistons 12 in the cylinders will be varied accordingly. That is to say, the adjusting device 34 is rotated to the right or left, depending upon whether the meter displacement is to be increased for rising temperature of the liquid being metered or decreased for falling temperature.

Clamped to the adjustment stem 34 by means of the bolts 41 and the split hub 42 is a wheel 43 which may be knurled as shown at 44 in Fig. 3 to facilitate manual turning thereof.

Temperature indications shown in Figs. 2 and 3 may be placed on the cylindrical exterior surface of the wheel 43 in accordance with predetermined calibrations, and a pointer 45 secured to the bowl 26 so as to be in proper position in accordance with such calibrations. A limit stop 47 on the wheel 43 is in position to abut against the pointer 45 to limit the rotation of the wheel 43.

In order to calibrate the temperature scale a thermometer is placed in the fluid stream somewhere near the meter and the wheel 43 is turned to adjust the elevation of the ball 28 until the meter registers accurately as may be determined by receiving the flow from the meter into accurate measure cans. When the meter is registering accurately the temperature of the thermometer is placed on the wheel 43 at the pointer 45. For instance, if the wheel 43 is turned to the right or left until the meter operates accurately as determined by the accurate measure cans so that the thermometer will read 90° Fahrenheit, this temperature may be placed on the scale as shown in Fig. 2. The temperature of the liquid flowing to the meter is then changed so as to obtain a calibration of all of the other temperature readings in the same manner.

After the wheel 43 has been calibrated in the manner described and the temperature scale accurately placed on the wheel, the measure cans need no longer be used. In order to adjust the meter so as to measure the flow accurately in accordance with the temperature of the liquid, all that is necessary on the part of the operator is to read the thermometer located at the fluid stream near the meter and then set the temperature adjustment wheel 43 so that the pointer 45 on the meter will coincide with the temperature figures on the wheel 43 corresponding with the thermometer reading. For instance, if the liquid to be metered is 100°, the wheel 43 should be turned until the pointer 45 is at the 100° mark. This may be done with the assurance that by reason of the previous calibrations of the readings, the meter will accurately register the flow of the liquid having the temperature of 100°.

It is preferred that the pitch of the threads of the screw-threaded stem 27 be such that the wheel 43 need not be turned or rotated completely to secure all of the required adjustments over a wide range of temperatures. The stop 47 may then be used so that the calibrations will be accurate within the limits of the turning movement of the wheel 43. In other words, the stop 47 by preventing more than a complete rotation of the wheel 43 will always cause the adjusting mechanism to be at a predetermined point when the pointer 45 is at any of its temperature marks on the temperature scale.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:

1. The combination with a displacement meter, of means for varying the displacement of the meter for temperature variations of the liquid being metered, means for actuating said varying means, a temperature scale on said actuator, and a pointer on the meter associated with said scale.

2. The combination with a displacement meter, of means for adjusting the same for temperature, comprising an actuator projecting from the meter, a temperature setting scale, and means for adjustably connecting said scale to said actuator.

3. The combination with a meter comprising a wabble plate and a fixed circular rail upon which said wabble plate is adapted to travel, of means for adjusting the elevation of said wabble plate from outside the meter, a wheel connected to said adjusting means, and temperature setting means comprising a temperature scale on said wheel and an indicator on the meter associated with the scale.

4. The combination with a displacement meter, of temperature adjusting means therefor, a knurled wheel with a temperature scale thereon connected to said adjusting means, and a pointer on said meter associated with said scale to enable setting the adjustment of the meter in accordance with the temperature of the liquid being metered.

5. The combination with a meter having a part shiftable by the flow of fluid being metered, of means for adjusting the shiftable part for the temperature of the fluid being metered, a rotary actuating stem connected to said adjusting means at the bottom thereof and projecting from the bottom of the meter, a stuffing box through which said actuating stem extends and means forming a scale and index to designate the position in which the rotary actuating stem should be set for conditioning the adjusting means in accordance with the characteristics of the fluid being metered.

6. The combination with a displacement meter, of means for adjusting the same to compensate for variation in temperature of the fluid being metered, a wheel connected to said adjusting means to operate the same, said wheel having a temperature scale thereon and a pointer on the meter associated with said temperature scale to indicate the point where said wheel should be set to operate said adjusting means to correspond with the temperature of the fluid being metered.

7. The combination with a meter having a part movable between limits by the flow of fluid to be metered, of means for adjusting the limits of the movable part comprising a stem protruding from the bottom of the meter, a wheel adjustably clamped to said stem to operate said adjusting means to compensate for variation in temperature in the fluid being metered and temperature setting indicating means comprising a pointer cooperating with a temperature scale.

8. The combination with a meter, of adjusting means therefor, a rotary actuating key, a key stem projecting outside of the meter, and a flexible coupling between said key and said adjusting means.

9. The combination with a meter, of adjusting means therefor, an adjusting key, and a flexible coupling between said key and said adjusting means, said coupling having slots at its ends in planes extending transversely to each other to afford flexibility between said stem and said adjusting means.

10. The combination with a meter, of adjusting means therefor, a rotary actuating stem extending outside of the meter, a key at the inner end of said actuating stem, and a cylindrical coupling having slots in its ends at right angles to each other, one of said slots being connected to said adjusting means, and the other slot being connected to said key.

11. The combination with a displacement meter, of means for varying the displacement of the meter in accordance with variations of temperature of the liquid being metered, means for actuating said varying means, and means comprising an index and temperature scale associated with said actuator to indicate the position at which said actuating means is to be set to effect the proper variation of the displacement of the meter for the temperature of the liquid being metered.

12. The combination with a displacement meter, of mechanism for adjusting the displacement thereof to compensate for variation of temperature of the liquid being metered, said mechanism including a relatively movable part and a relatively stationary part, and means including a temperature scale and an index, the one mounted on the movable part and the other on the relatively stationary part and adapted to cooperate to indicate the position at which the relatively movable part should be set in order to adjust the mechanism in accordance with the temperature of the liquid being metered.

13. The combination with a displacement meter, of means for varying the displacement of the meter to adjust the same to measure accurately for variations in temperature of the liquid being metered, an actuator for said adjusting means extending to the exterior of the meter, and means on said actuator and associated with the body of the meter for indicating the temperature setting of the actuator.

14. The combination with a displacement meter, of means for adjusting the same to compensate for a variation in temperature, a wheel for operating said adjusting means and having a temperature scale calibrated according to the temperature of the liquid being metered, and an indicator on the meter co-acting the said scale to enable said wheel to be operated to actuate said adjusting means.

15. The combination with a displacement meter, of means for adjusting the same to compensate for variation in temperature, a wheel connected to said adjusting means to rotate therewith, a pointer on the meter, and a temperature scale on said wheel calibrated to co-act with said pointer to indicate the setting of the adjusting means.

16. The combination with a displacement meter, of means for adjusting the same to compensate for temperature, means forming a temperature scale, a pointer co-acting with said temperature scale for indicating the setting of the latter in accordance with the temperature of the liquid to be metered, and means bearing said temperature scale for operating said adjusting means to such an extent as to cause the meter to accurately measure the liquid at that temperature.

17. The combination with a displacement meter, of means for adjusting the same to compensate for variations in temperature of the liquid being metered, and means comprising a temperature scale co-operating with said adjusting means to predetermine the setting of the latter, said temperature scale being calibrated for adjustment corresponding to the temperature of the liquid being metered.

18. The combination with a displacement meter for measuring flow of liquid, of means for adjusting the same to compensate for variations of temperature of the liquid being metered, and means comprising a temperature calibrated setting device connected to said adjusting means for operation from the outside of the meter in accordance with the temperature of the liquid being metered.

19. The combination with a displacement meter, of means for adjusting the same to compensate for variations of temperature of the liquid being measured, means connected to said adjusting means to operate the same from without the meter, and means providing indicating marks to enable adjustment to be made for given temperatures of liquid being metered.

20. The combination with a displacement meter, of means for adjusting the same to compensate for variation in temperature, means for operating said adjusting means, a temperature scale connected for movement with said operating means, and a pointer co-operating with said scale to indicate the adjustment for the temperature of the liquid being metered.

21. The combination with a displacement meter, of means for adjusting the same to compensate for variation in temperature, mechanism for operating said adjusting means, and means connected to said operating mechanism for indicating the extent to which the same should be operated so as to correspond with the temperature of the liquid being metered.

22. The combination with a displacement meter, of means for varying the displacement of the meter to adjust the same to measure accurately for variations in temperature of the liquid being metered, an actuator for said adjusting means extending to the exterior of said meter, a wheel connected to said actuator and having a temperature scale thereon, and an index pointer on the meter in position to co-operate with said temperature scale.

23. The combination with a meter comprising a wabble plate and a fixed circular rail upon which said wabble plate is adapted to travel, of means for adjusting the elevation of said wabble plate, means extending to a position for actuation outside of the meter for operating said adjusting means, and mechanism affording a temperature scale and index to indicate the position at which said actuating means should be set for operation of said adjusting means in accordance with the temperature of the liquid being metered.

24. The combination with a meter comprising an oscillating member and fixed stop means against which said member is adapted to operate, of means for adjusting the member with respect to the stop means, said adjusting means extending to a position for actuation outside of the meter for operating the adjusting means, and means forming a temperature scale and index to indicate the position at which said actuating means shall be set for actuation of said adjusting means in accordance with the fluid being metered.

HOSMER L. BLUM.